US009646761B2

(12) United States Patent
Lin et al.

(10) Patent No.: US 9,646,761 B2
(45) Date of Patent: May 9, 2017

(54) POWER TRANSMISSION TRANSFORMER WITH A NOISE INHIBITING FUNCTION

(71) Applicant: Fortune Electric Co., Ltd., Taoyuan (TW)

(72) Inventors: Chia-Ching Lin, Taoyuan (TW); Ching-Min Chen, Taoyuan (TW)

(73) Assignee: Fortune Electric Co., Ltd., Taoyuan (TW)

( * ) Notice: Subject to any disclaimer, the term of this patent is extended or adjusted under 35 U.S.C. 154(b) by 103 days.

(21) Appl. No.: 14/810,823

(22) Filed: Jul. 28, 2015

(65) Prior Publication Data

US 2017/0032890 A1 Feb. 2, 2017

(51) Int. Cl.

*H01F 27/20* (2006.01)
*H02K 5/24* (2006.01)
*H01F 27/33* (2006.01)
*H01F 27/12* (2006.01)

(52) U.S. Cl.

CPC ............ *H01F 27/33* (2013.01); *H01F 27/12* (2013.01)

(58) Field of Classification Search

CPC ... H01F 27/236; H01F 27/306; G10K 11/002; G10K 11/161; G10K 2210/5224
USPC .......... 336/55, 57, 58, 68, 67, 100; 181/202, 181/207, 208; 381/171
See application file for complete search history.

(56) References Cited

U.S. PATENT DOCUMENTS

| | | | | | |
|---|---|---|---|---|---|
| 2,776,020 | A * | 1/1957 | Conover | G10K 11/1788 | 336/100 |
| 3,792,397 | A * | 2/1974 | Reinemann | H01F 27/33 | 336/100 |
| 4,497,487 | A * | 2/1985 | Crippen | A63F 9/0415 | 273/146 |
| 4,514,714 | A * | 4/1985 | Kanoi | H01F 27/33 | 181/202 |
| 4,558,296 | A * | 12/1985 | Thoren | H01F 27/33 | 181/202 |
| 5,617,479 | A * | 4/1997 | Hildebrand | G10K 11/1786 | 381/71.3 |
| 5,692,053 | A * | 11/1997 | Fuller | G10K 11/1788 | 381/71.3 |
| 5,724,017 | A * | 3/1998 | Pla | H01F 27/33 | 336/100 |
| 6,633,107 | B1 * | 10/2003 | Calabro' | H01F 27/33 | 310/321 |

(Continued)

*Primary Examiner* — Alexander Talpalatski
*Assistant Examiner* — Joselito Baisa
(74) *Attorney, Agent, or Firm* — Alan D. Kamrath; Kamrath IP Lawfirm, P.A.

(57) ABSTRACT

A power transmission transformer (1) includes a transformer body (11). Each of two upper pipings (3) is connected between the transformer body (11) and one of two heat dissipators (2, 21) outside of the transformer body (11). Each of two lower pipings (4) is connected between the transformer body (11) and one of the heat dissipators (2, 21). A sound absorbing device (6, 61) is mounted between and spaced from one of two sidewalls of the transformer body (11) and one of the heat dissipators (2, 21). The sound absorbing device (6, 61) is fixed to one of the upper pipings (3) and one of the lower pipings (4). An outer wallboard (63) and a sound absorbing material (64) are respectively mounted to two sides of at least one fixing frame (62) of the sound absorbing device (6, 61).

10 Claims, 11 Drawing Sheets

(56) References Cited

U.S. PATENT DOCUMENTS

| | | | | |
|---|---|---|---|---|
| 8,044,307 | B2 * | 10/2011 | Anger | H01F 27/06 174/520 |
| 8,555,485 | B2 * | 10/2013 | Carrasco Aguirre | H01F 27/33 29/602.1 |

* cited by examiner

POWER TRANSMISSION TRANSFORMER WITH A NOISE INHIBITING FUNCTION

BACKGROUND OF THE INVENTION

The present invention relates to a power transmission transformer with a noise inhibiting function and, more particularly, to a power transmission transformer including sound absorbing devices between a housing and two heat dissipators on two sides of the housing.

A housing of a super high voltage transformer for transmitting electricity is generally a hollow, closed, parallelepiped placed on the ground. An iron core and windings are placed in an interior of the housing that is filled with a transformer oil (an insulating oil) for cooperating with heat dissipators of cooling systems on two sides of the housing for rapid heat dissipation.

During manufacture of the conventional transformer, the housing is subject to a vacuum process. To increase the structural strength of the housing, outwardly protruding reinforcing frames are welded to upper and lower sections of the outer periphery of the housing. The iron core and the windings generate noise when the transformer operates. The resonant noise from the upper and intermediate sections of the housing of the transformer greatly disturb the environment and the workers therearound. Furthermore, the structure at the upper and intermediate sections of the housing is complicated and includes the reinforcing frames and related members, failing to effectively wrap and connect the sound absorbing devices. Furthermore, the resonance of the housing will be directly transmitted to the sound absorbing devices, resulting in greater noise. The manufacturers and the power companies are troubled by these disadvantages and cannot find a way to effectively solve these disadvantages.

Thus, a need exists for a novel power transmission transformer to mitigate and/or obviate the above disadvantages.

BRIEF SUMMARY OF THE INVENTION

The primary objective and the main function of the present invention is to provide a power transmission transformer including at least one sound absorbing device on at least one of two sides of the housing and between a housing and at least one of two heat dissipators, providing a single-side or double-side sound-absorbing effect to prohibit and reduce the resonant noise from the housing, avoiding disturbance to the environment and the workers therearound. Furthermore, the power transmission transformer is easy to manufacture and assemble, reducing the costs.

A power transmission transformer with a noise inhibiting function according to the present invention includes a transformer body having a housing. The housing is a parallelepiped and includes two sidewalls opposite to each other. The housing further includes two end walls opposite to each other. Two heat dissipators are mounted outside of the transformer body. The two heat dissipators respectively face and are spaced from the two sidewalls. Two upper pipings and two lower pipings are provided. Each of the two upper pipings is connected between the transformer body and an upper section of one of the two heat dissipators. A transformer oil received in the transformer body is adapted to flow into the two heat dissipators via the two upper pipings. Each of the two lower pipings is connected between the transformer body and a lower section of one of the two heat dissipators. The transformer oil in each of the two heat dissipators is adapted to flow through the two lower pipings into the transformer body. A first sound absorbing device is mounted between and spaced from one of the two sidewalls of the housing and one of the two heat dissipators. The first sound absorbing device is fixed to one of the two upper pipings and one of the two lower pipings. The first sound absorbing device includes at least one fixing frame having a first side facing the one of the two heat dissipators and a second side facing the transformer body. The first sound absorbing device further includes an outer wallboard mounted to the first side of the at least one fixing frame of the first sound absorbing device. The first sound absorbing device further includes a sound absorbing material mounted to the second side of the at least one fixing frame of the first sound absorbing device and configured to inhibit and reduce resonant noise from the housing of the transformer body.

The first sound absorbing device can further include an outer shielding board. The at least one fixing frame and the outer shielding board define a space receiving the sound absorbing material. The outer shielding board includes a plurality of vents.

The sound absorbing material of the first sound absorbing device can be wrapped by a waterproof film.

The power transmission transformer can further include a second sound absorbing device mounted between mounted between and spaced from the other of the two sidewalls of the transformer body and the other of the two heat dissipators. The second sound absorbing device is fixed to the other of the two upper pipings and the other of the two lower pipings. The second sound absorbing device includes at least one fixing frame having a first side facing the other of the two heat dissipators and a second side facing the transformer body. The second sound absorbing device further includes an outer wallboard mounted to the first side of the at least one fixing frame of the second sound absorbing device. The second sound absorbing device further includes a sound absorbing material mounted to the second side of the at least one fixing frame of the second sound absorbing device configured to inhibit and reduce resonant noise from the housing of the transformer body.

Each of the two upper pipings can include an upper connection pipe extending horizontally. The upper connection pipe of each of the two upper pipings includes a first upper fitting connected to an upper section of the housing of the transformer body and a plurality of second upper fittings connected to the upper section of one of the two heat dissipators. Each of the two lower pipings includes a lower connection pipe extending horizontally. The lower connection pipe of each of the two lower pipings includes a first lower fitting connected to a lower section of the housing of the transformer body and a plurality of second lower fittings connected to the lower section of one of the two heat dissipators. The at least one fixing frame of the first sound absorbing device is fixed between the upper connection pipe of one of the two upper pipings and the lower connection pipes of one of the two lower pipings. The at least one fixing frame of the second sound absorbing device is fixed between the upper connection pipe of the other of the two upper pipings and the lower connection pipe of the other of the two lower pipings.

Each lower connection pipe can include a plurality of brackets connected to one of the two sidewalls of the housing of the transformer body. A plurality of posts is fixed between one of the upper connection pipes and one of the lower connection pipes and is spaced from each other. The at least one fixing frame of each of the first and second sound absorbing devices includes a plurality of fixing frames. Each of the plurality of fixing frames is fixed between two adjacent posts.

Each of the upper connection pipes, the lower connection pipes, and the plurality of posts can include a plurality of fixing plates. Each of the plurality of fixing plates has a fixing hole. Each outer wallboard includes a plurality of fixing holes aligned with the fixing holes of the plurality of fixing plates of the upper connection pipes, the lower connection pipes, and the plurality of posts. A plurality of bolts extends through the plurality of fixing holes of each outer wall board and the fixing holes of the plurality of fixing plates of the upper connection pipes, the lower connection pipes, and the plurality of posts.

A resilient frame pad can be mounted around each of the plurality of fixing frames. Each resilient frame pad has an outer side contacting with one of the upper connection pipes, one of the lower connection pipes, two adjacent posts, and the plurality of fixing plates of the one of the upper connection pipes, the one of the lower connection pipes, and the two adjacent posts.

Each of the first and second sound absorbing devices can further include a plurality of outer shielding boards. Each of the plurality of fixing frames and one of the plurality of outer shielding boards define a space receiving one of the sound absorbing materials. Each of the plurality of outer shielding boards includes a plurality of vents.

The sound absorbing material of each of the first and second sound absorbing devices can be wrapped by a waterproof film.

The present invention will become clearer in light of the following detailed description of illustrative embodiments of this invention described in connection with the drawings.

DETAILED DESCRIPTION OF THE INVENTION

Figure 1:
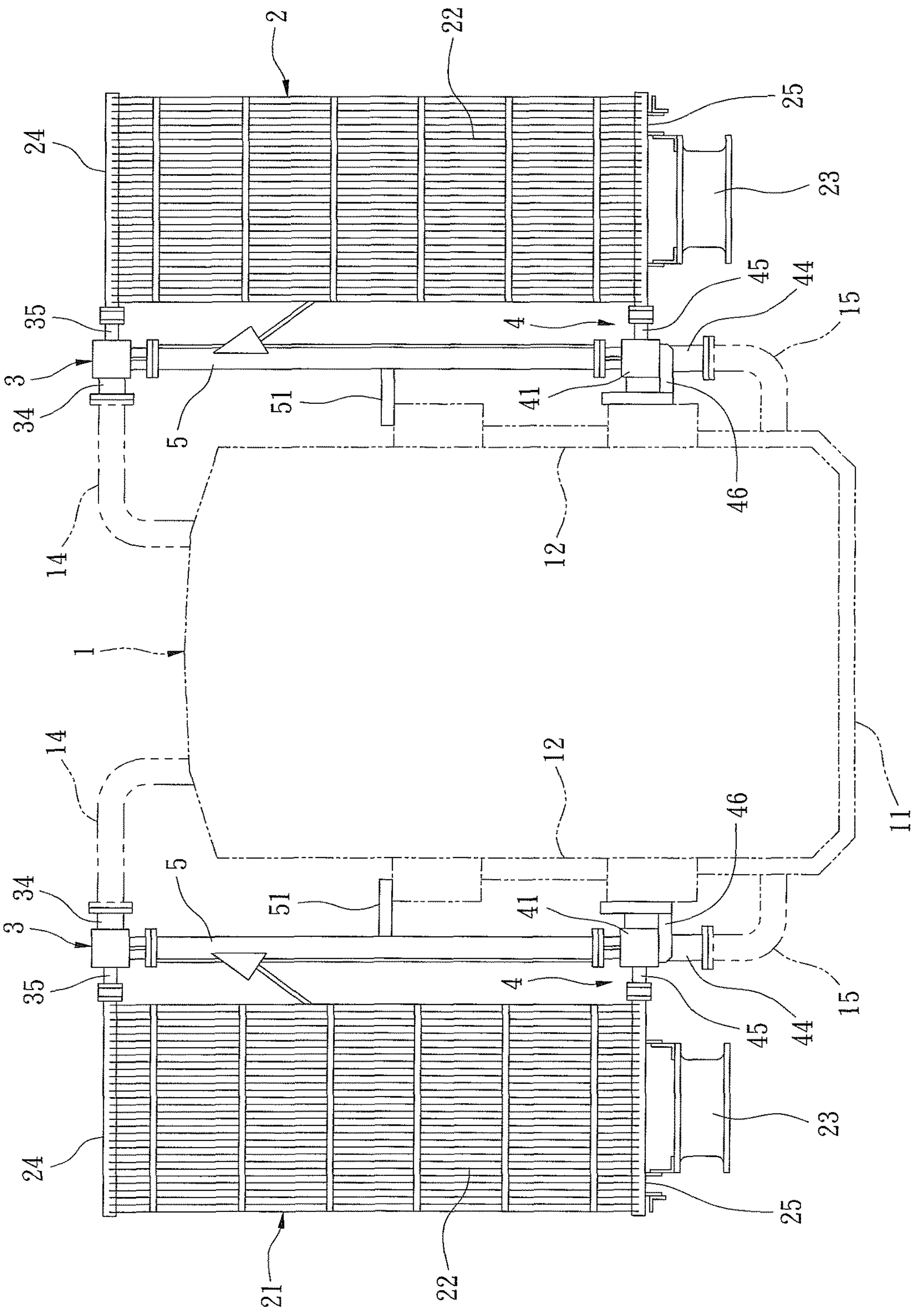
FIG. 1 is a diagrammatic front view of a power transmission transformer with a noise inhibiting function according to the present invention.
Figure 2:
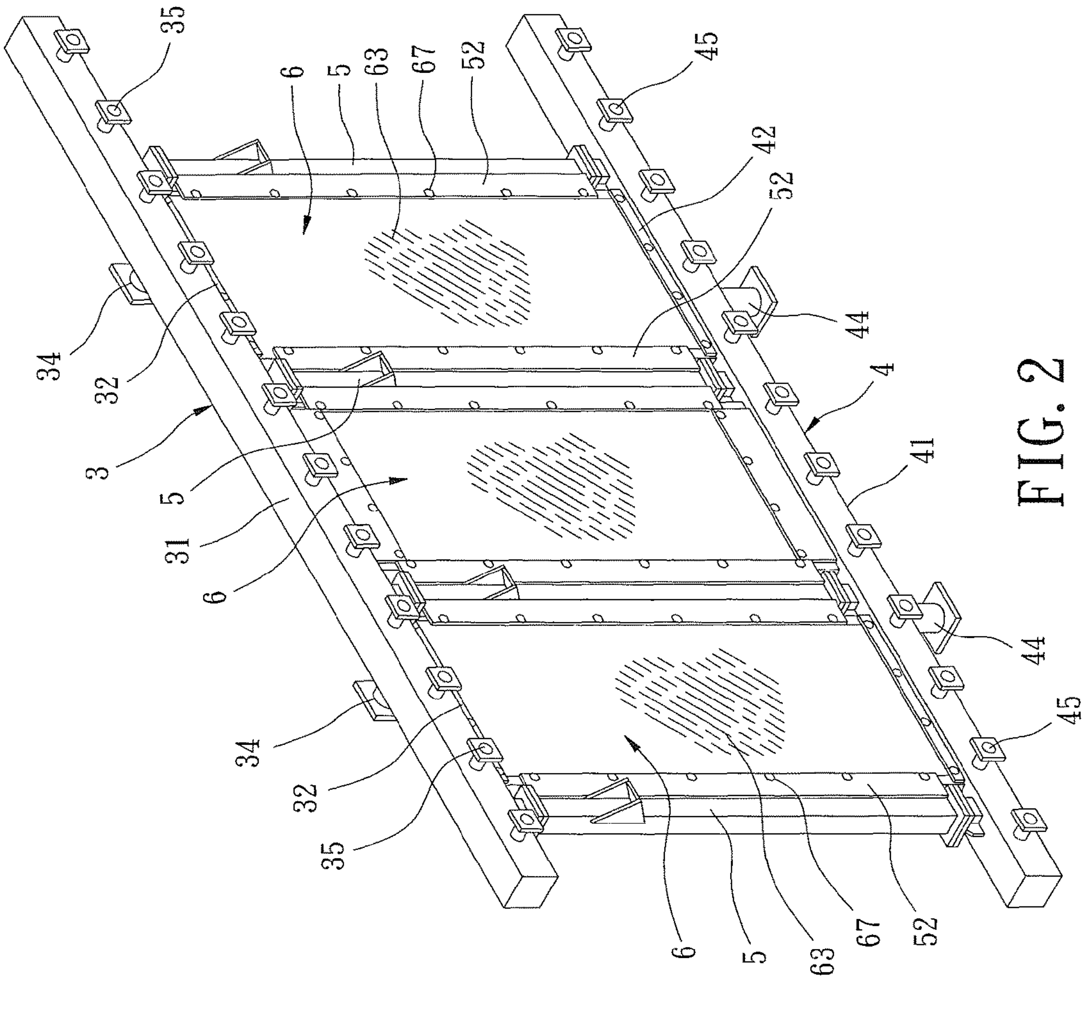
FIG. 2 is a perspective view of an upper piping, a lower piping, and a sound absorbing device on a side of the power transmission transformer of FIG. 1.
Figure 3:
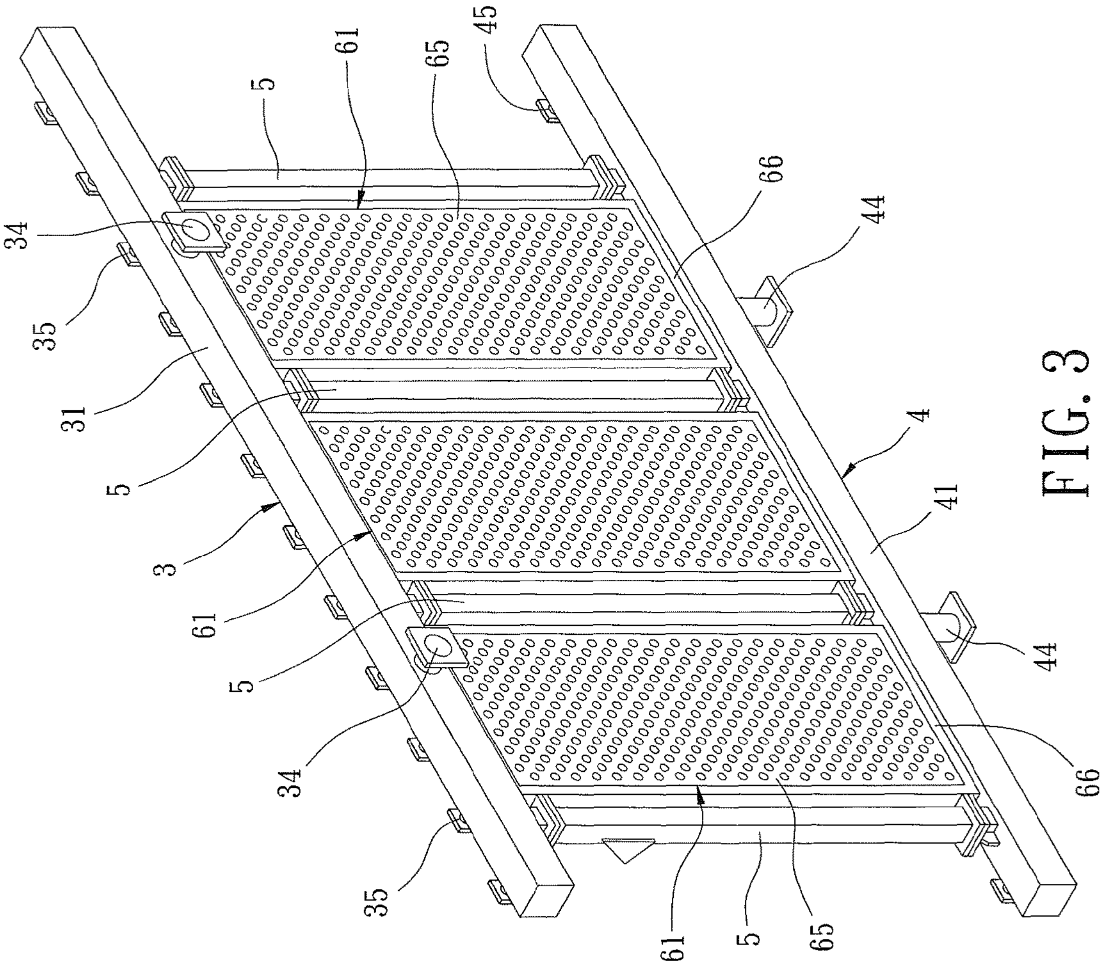
FIG. 3 is a perspective view of an upper piping, a lower piping, and a sound absorbing device on the other side of the power transmission transformer of FIG. 1.

With reference to FIGS. 1-8, a power transmission transformer with a noise inhibiting function according to the present invention includes a transformer body 1, two heat dissipators 2 and 21, two upper pipings 3, two lower pipings 4, a plurality of posts 5, an two sound absorbing devices 6 and 61.

Figure 4:
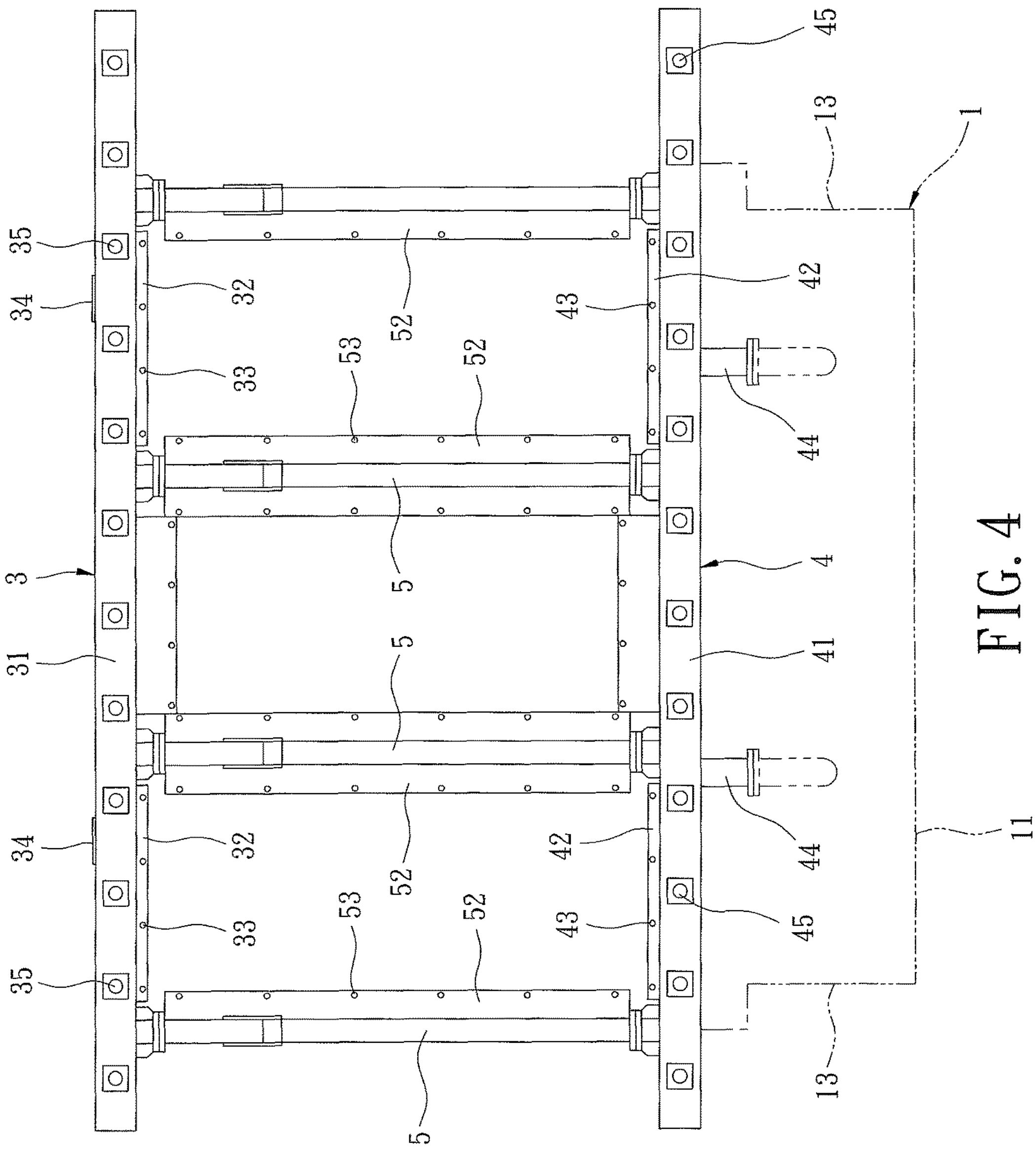
FIG. 4 is a side elevational view of an upper piping, a lower piping, and posts on a side of the power transmission transformer of FIG. 1.
Figure 5:
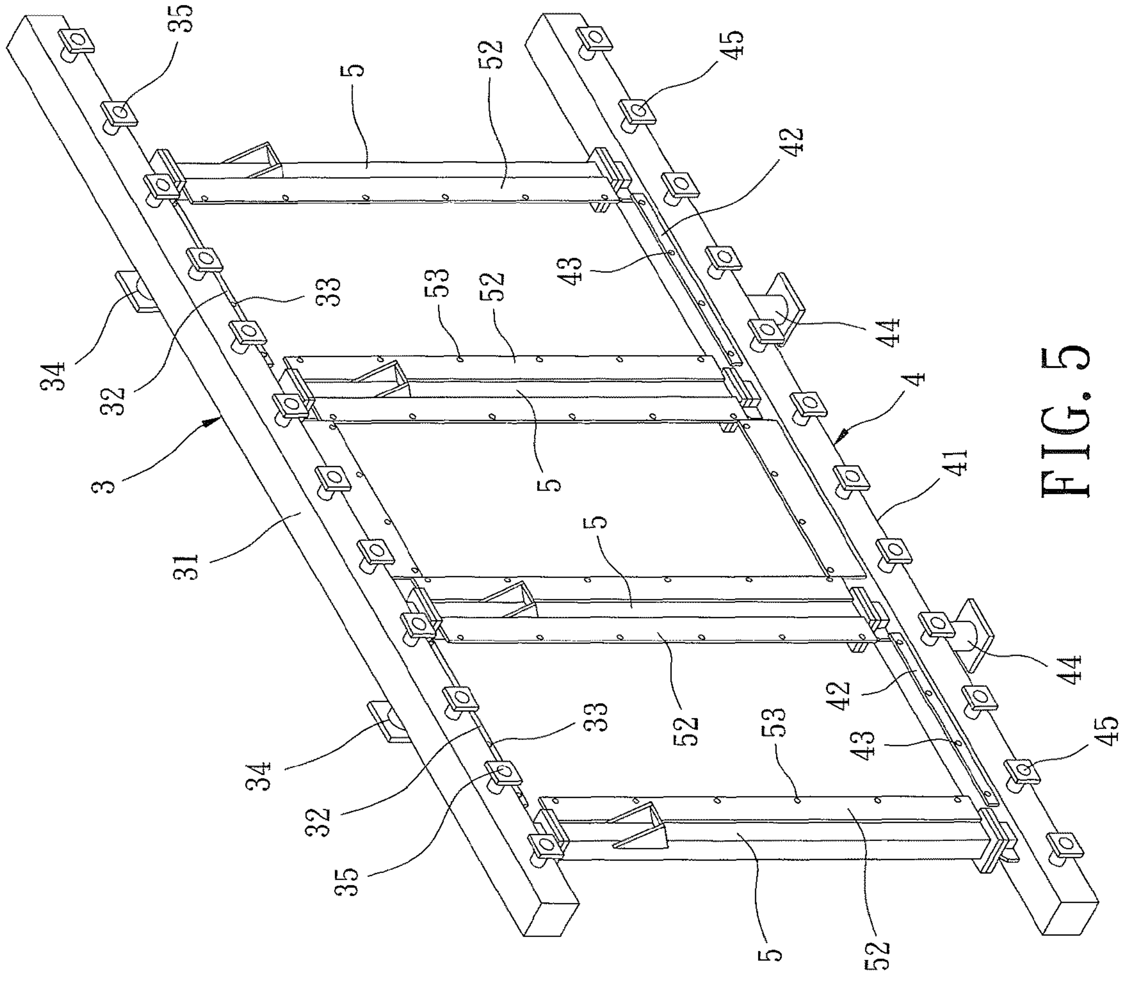
FIG. 5 is a perspective view of the upper piping, the lower piping, and the posts of FIG. 4.
Figure 6:
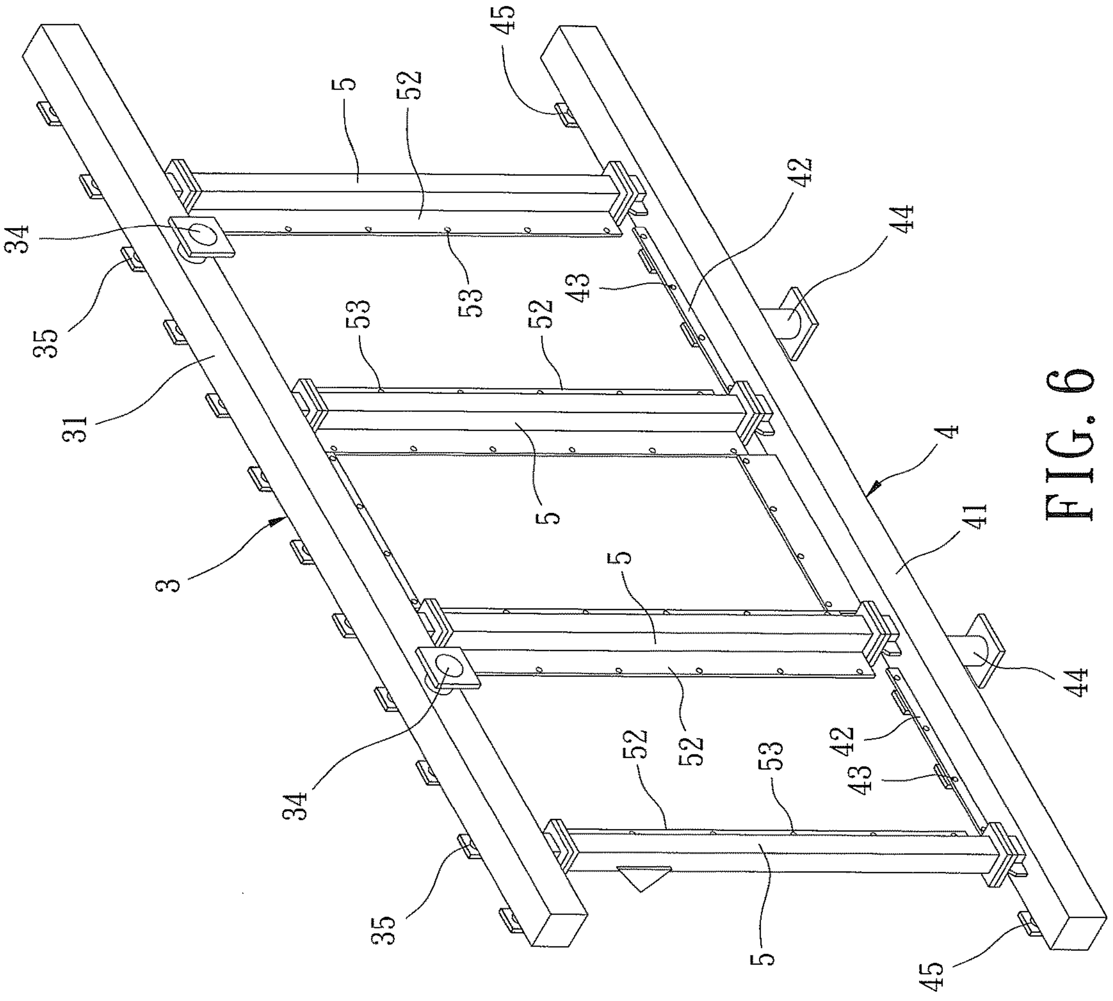
FIG. 6 is a side elevational view of an upper piping, a lower piping, and posts on the other side of the power transmission transformer of FIG. 1.
Figure 7:
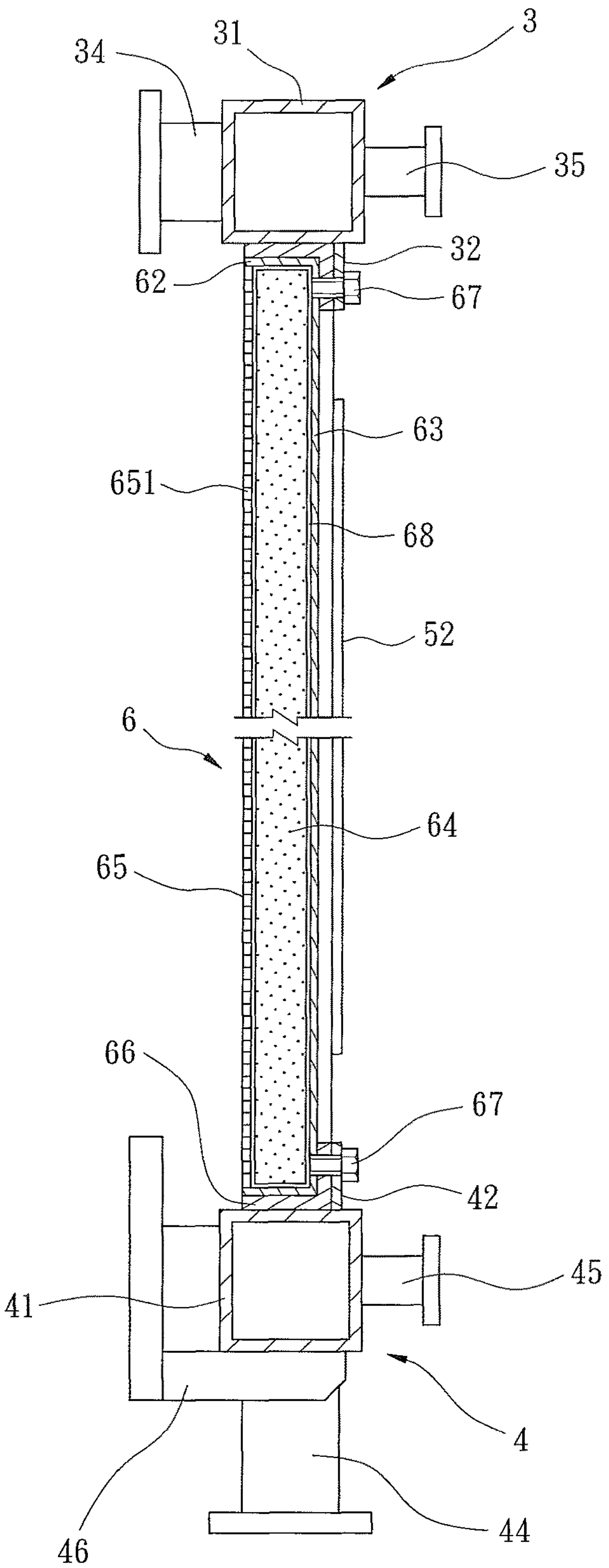
FIG. 7 is a longitudinal cross sectional view of the upper piping, the lower piping, and the sound absorbing device on the side of the power transmission transformer shown in FIG. 2.
Figure 8:
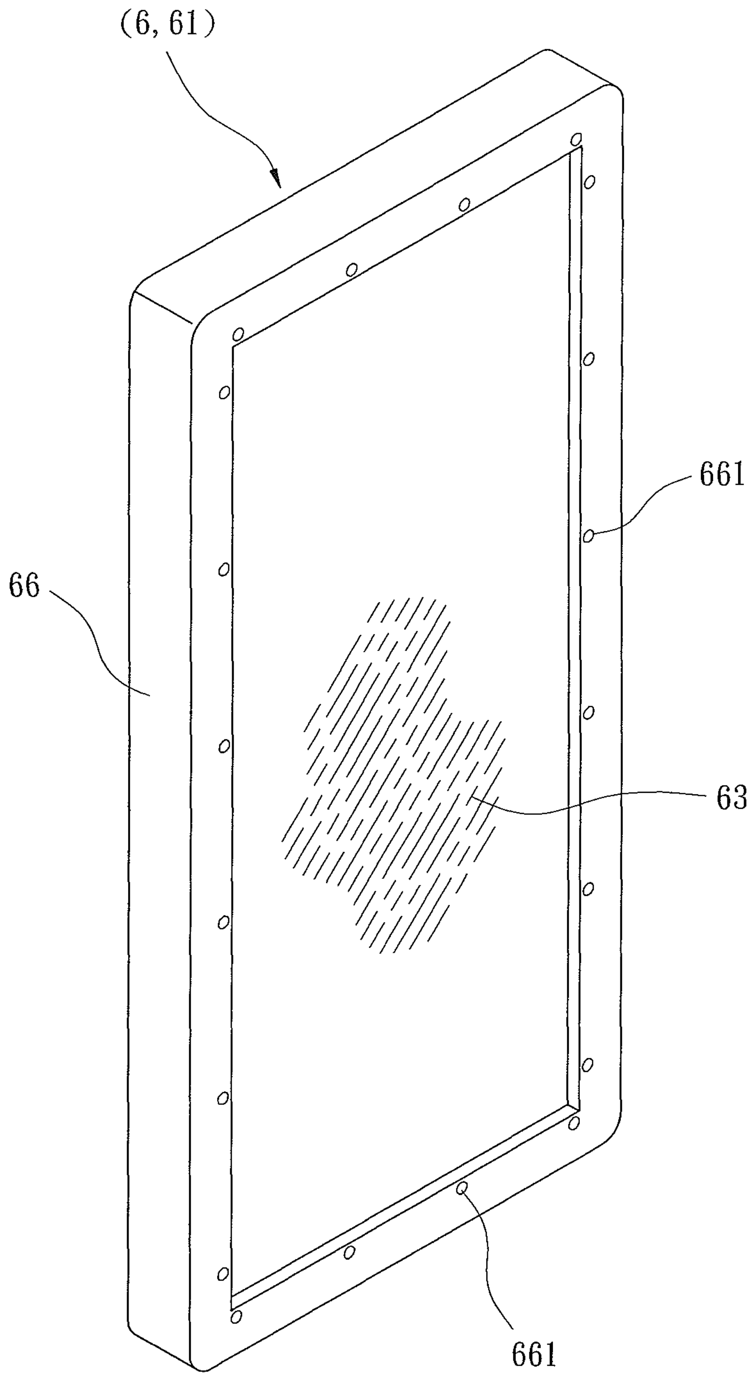
FIG. 8 is a perspective view of the sound absorbing device of FIG. 2.
Figure 9:
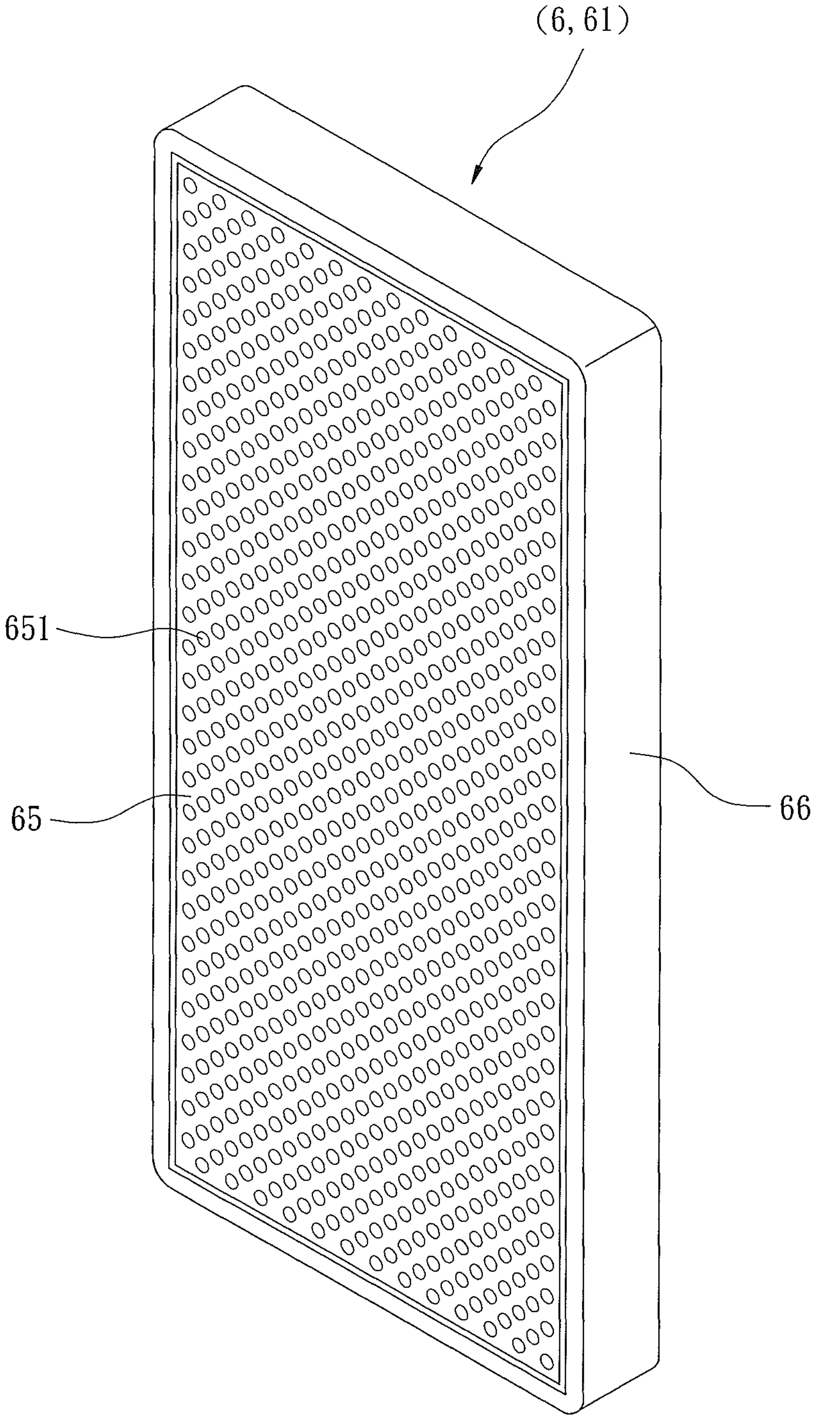
FIG. 9 is another perspective view of the sound absorbing device of FIG. 8.
Figure 10:
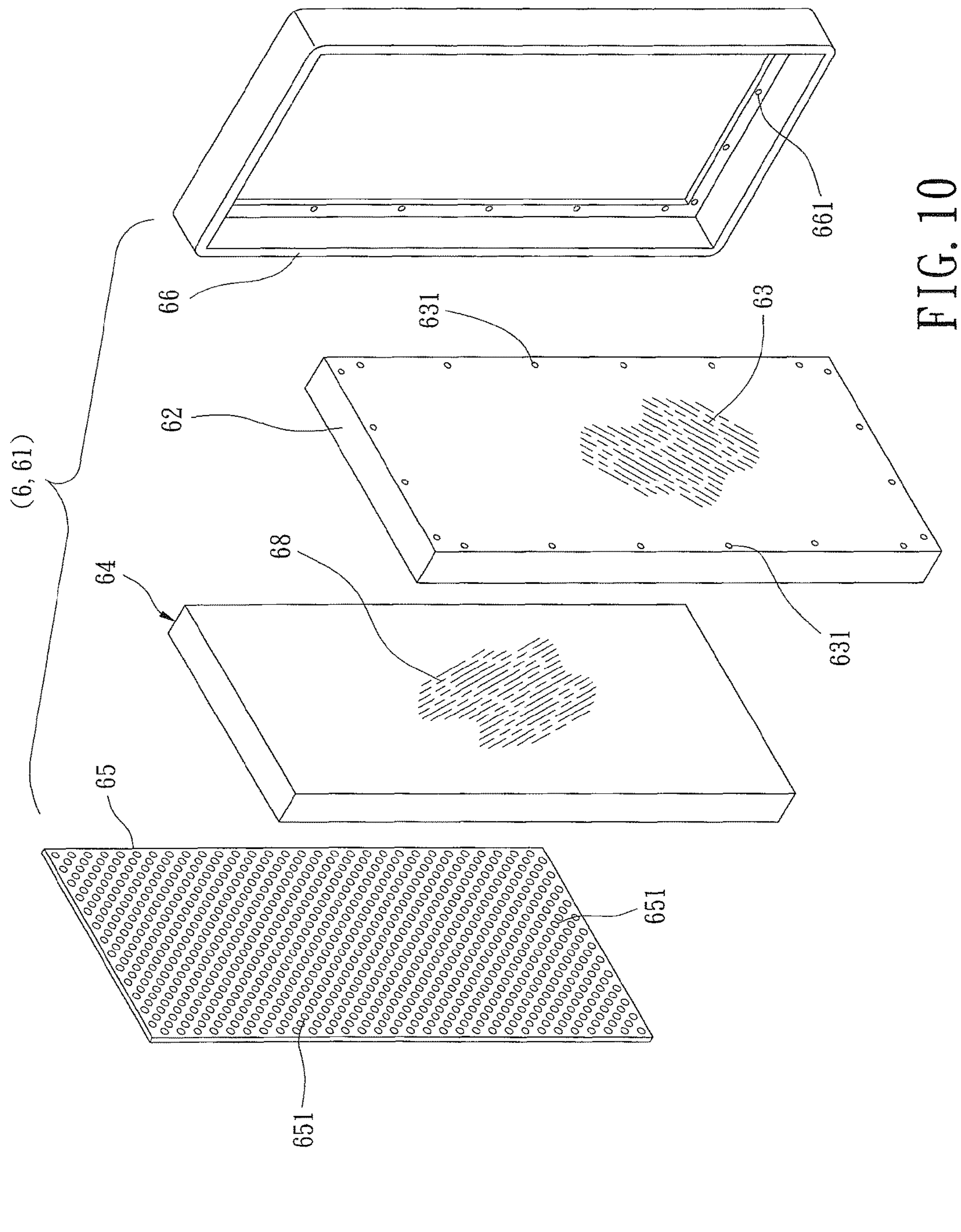
FIG. 10 is an exploded, perspective ,view of the sound absorbing device of FIG. 8.
Figure 11:
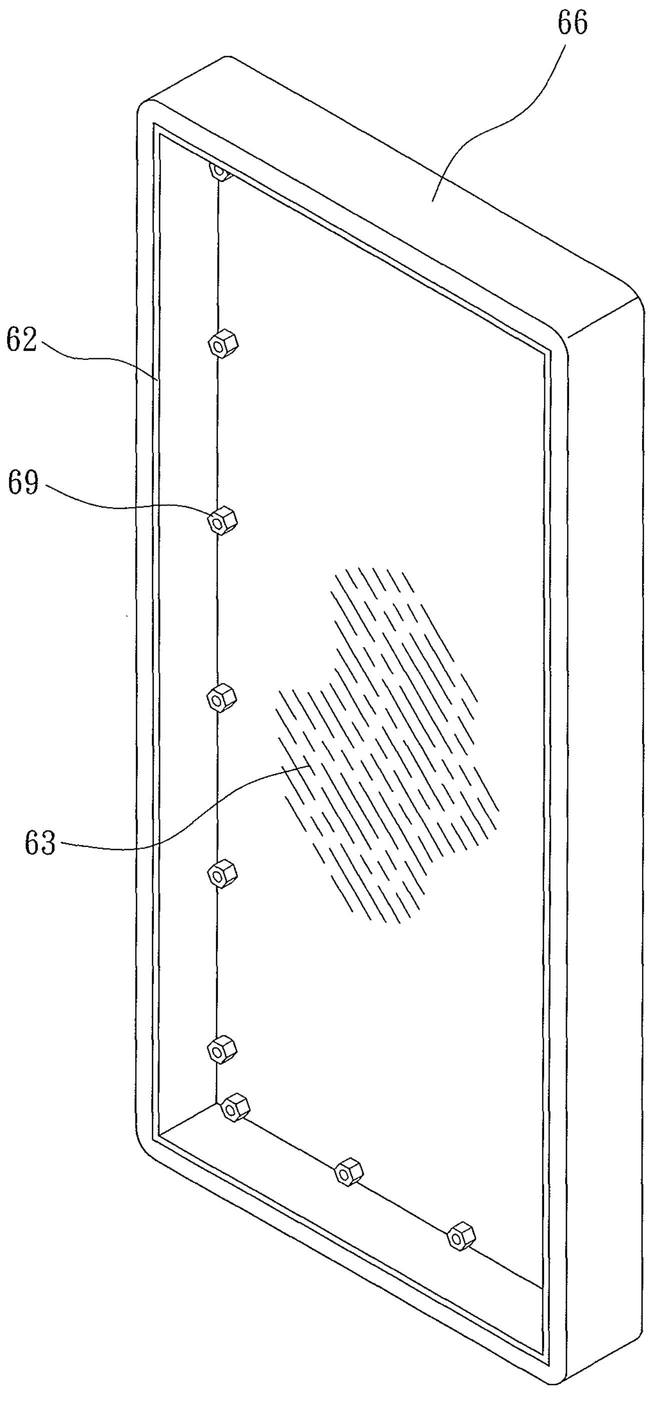
FIG. 11 is a perspective view illustrating the other side of a fixing frame of the sound absorbing device of FIG. 10.

The transformer body 1 includes a housing 11 in the form of a parallelepiped (see FIGS. 1 and 4). The housing 11 includes two sidewalls 12 opposite to each other and two end walls 13 opposite to each other. Two upper fittings 4 and two lower fittings 15 are connected to two sides of the housing 11.

The two heat dissipators 2 and 21 are mounted outside of the transformer body 1 and respectively face the two sidewalls 12. Each of the two dissipators 2 and 21 is spaced from one of the two sidewalls 12 of the transformer body 1. Each heat dissipator 2 and 21 includes a plurality of fins 22 and is connected to a fan 23, an upper fitting 24, and a lower fitting 25.

Each of the two upper pipings 3 is connected between the transformer body 1 and an upper section of one of the two heat dissipators 2 and 21. Each of the two upper pipings 3 includes an upper connection pipe 31 extending horizontally. Each upper connection pipe 31 includes one or two first upper fittings 34 connected to the upper fittings 14 on an upper section of the housing 11 of the transformer body 1 and a plurality of second upper fittings 35 connected to the upper fittings 24 on the upper section of one of the two heat dissipators 2 and 21. A transformer oil received in the transformer body 1 is adapted to flow into the two heat dissipators 2 and 21 via the two upper pipings 3 for dissipating heat.

Each of the two lower pipings 4 is connected between the transformer body 1 and a lower section of one of the two heat dissipators 2 and 21. Each of the two lower pipings 4 includes a lower connection pipe 41 extending horizontally. Each lower connection pipe 41 includes one or two first lower fittings 44 connected to the lower fittings 15 on a lower section of the housing 11 of the transformer body 1 and a plurality of second lower fittings 45 connected to the lower fittings 25 on the lower section of one of the two heat dissipators 2 and 21. Each lower connection pipe 41 further includes a plurality of brackets 46 (see FIGS. 1 and 7) connected to one of the two sidewalls 12 of the housing 11 of the transformer body 1. The transformer oil in each of the two heat dissipators 2 and 21 is adapted to flow through the two lower pipings 4 into the transformer body 1.

Each post 5 is fixed between one of the two upper connection pipes 31 and one of the two lower connection pipes 41. The posts 5 are spaced from each other. Each of the upper connection pipes 31, the lower connection pipes 41, and the posts 5 includes a plurality of fixing plates 32, 42, 52. Each of the fixing plates 32, 42, and 52 has a fixing hole 33, 43, 53. Furthermore, each post 5 includes a bracket 51 (FIG. 1) fixed to one of the two sidewalls 12 of the housing 11.

With reference to FIGS. 2, 3, and 7-11, one of the two sound absorbing devices 6 and 61 is mounted between and spaced from one of the two sidewalls 12 of the transformer body 1 and one of the two heat dissipators 2 and 21 and is fixed to one of the two upper pipings 3 and one of the two lower pipings 4. The other of the two sound absorbing devices 6 and 61 is mounted between mounted between and spaced from the other of the two sidewalls 12 of the transformer body 1 and the other of the two heat dissipators 2 and 21 and is fixed to the other of the two upper pipings 3 and the other of the two lower pipings 4.

Each of the two sound absorbing devices 6 and 61 includes at least one fixing frame 62 having a first side facing the one of the two heat dissipators 2 and 21 and a second side facing the transformer body 1. Each fixing frame 62 is fixed between two adjacent posts 5. An outer wallboard 63 is mounted to the first side of each fixing frame 62. Each outer wallboard 63 includes a plurality of fixing holes 631 aligned with the fixing holes 33, 43, and 53 of the fixing plates 32, 42, and 52 of the upper connection pipes 31, the lower connection pipes 41, and the posts 5 (see FIGS. 4-6). A plurality of bolts 67 (FIGS. 2 and 7) extends through the fixing holes 631 of each outer wall board 63 and the fixing holes 33, 43, and 53 of the fixing plates 32, 42, and 52 of the upper connection pipes 31, the lower connection pipes 41, and the posts 5.

A sound absorbing material 64 is mounted to the second side of each fixing frame 62. The sound absorbing material 64 is configured to inhibit and reduce resonant noise from the housing 11 of the transformer body 1. Each of the two sound absorbing devices 6 and 61 further includes a plurality of outer shielding boards 65. Each fixing frame 62 and one of the outer shielding boards 65 define a space receiving one of the sound absorbing materials 64. Each outer shielding board 65 includes a plurality of vents 651. Each sound absorbing material 64 is wrapped by a waterproof film 68 to avoid rainwater from entering the sound absorbing material 64.

A resilient frame pad 66 is mounted around each fixing frame 62. Each resilient frame pad 66 has an outer side contacting with one of the upper connection pipes 31, one of the lower connection pipes 41, two adjacent posts 5, and the fixing plates 32, 42, 52 of the one of the upper connection pipes 31, the one of the lower connection pipes 41, and the two adjacent posts 5, providing a cushioning effect. Each resilient pad frame 66 includes a plurality of fixing holes 661 through which the bolts 67 extend.

In the power transmission transformer according to the present invention, the two sound absorbing devices 6 and 61 are mounted between the upper and intermediate sections of the housing 11 and the heat dissipators 2 and 21 and are fixed between the upper connection pipes 31 and the lower connection pipes 41 to provide a single-side or a double-side sound-absorbing effect to prohibit and reduce the resonant noise from the housing 11, avoiding disturbance to the environment and the workers therearound. Furthermore, the power transmission transformer is easy to manufacture and assemble, reducing the costs.

Although specific embodiments have been illustrated and described, numerous modifications and variations are still possible without departing from the scope of the invention. The scope of the invention is limited by the accompanying claims.

The invention claimed is:

1. A power transmission transformer with a noise inhibiting function comprising:

a transformer body including a housing, with the housing being a parallelepiped and including two sidewalls opposite to each other, with the housing further including two end walls opposite to each other;

two heat dissipators mounted outside of the transformer body, with the two heat dissipators respectively facing and spaced from the two sidewalls;

two upper pipings, with each of the two upper pipings connected between the transformer body and an upper section of one of the two heat dissipators, with a transformer oil received in the transformer body adapted to flow into the two heat dissipators via the two upper pipings;

two lower pipings, with each of the two lower pipings connected between the transformer body and a lower section of one of the two heat dissipators, with the transformer oil in each of the two heat dissipators adapted to flow through the two lower pipings into the transformer body; and a first sound absorbing device mounted between and spaced from one of the two sidewalls of the housing and one of the two heat dissipators, with the first sound absorbing device fixed to one of the two upper pipings and one of the two lower pipings, with the first sound absorbing device including at least one fixing frame having a first side facing the one of the two heat dissipators and a second side facing the transformer body, with the first sound absorbing device further including an outer wallboard mounted to the first side of the at least one fixing frame of the first sound absorbing device, and with the first sound absorbing device further including a sound absorbing material mounted to the second side of the at least one fixing frame of the first sound absorbing device and configured to inhibit and reduce resonant noise from the housing of the transformer body.

2. The power transmission transformer with a noise inhibiting function as claimed in claim 1, with the first sound absorbing device further including an outer shielding board, with the at least one fixing frame and the outer shielding board defining a space receiving the sound absorbing material, and with the outer shielding board including a plurality of vents.

3. The power transmission transformer with a noise inhibiting function as claimed in claim 2, wherein the sound absorbing material of the first sound absorbing device is wrapped by a waterproof film.

4. The power transmission transformer with a noise inhibiting function as claimed in claim 1, further comprising a second sound absorbing device mounted between mounted between and spaced from another of the two sidewalls of the housing and another of the two heat dissipators, with the second sound absorbing device fixed to another of the two upper pipings and another of the two lower pipings, with the second sound absorbing device including at least one fixing frame having a first side facing the other of the two heat dissipators and a second side facing the transformer body, with the second sound absorbing device further including an outer wallboard mounted to the first side of the at least one fixing frame of the second sound absorbing device, and with the second sound absorbing device further including a sound absorbing material mounted to the second side of the at least one fixing frame of the second sound absorbing device configured to inhibit and reduce resonant noise from the housing of the transformer body.

5. The power transmission transformer with a noise inhibiting function as claimed in claim 4, with each of the two upper pipings including an upper connection pipe extending horizontally, with the upper connection pipe of each of the two upper pipings including a first upper fitting connected to an upper section of the housing of the transformer body and a plurality of second upper fittings connected to the upper section of one of the two heat dissipators, with each of the two lower pipings including a lower connection pipe extending horizontally, with the lower connection pipe of each of the two lower pipings including a first lower fitting connected to a lower section of the housing of the transformer body and a plurality of second lower fittings connected to the lower section of one of the two heat dissipators, and with the at least one fixing frame of the first sound absorbing device fixed between the upper connection pipe of one of the two upper pipings and the lower connection pipes of one of the two lower pipings, and with the at least one fixing frame of the second sound absorbing device fixed between the upper connection pipe of the other of the two upper pipings and the lower connection pipe of the other of the two lower pipings.

6. The power transmission transformer with a noise inhibiting function as claimed in claim 5, with each lower connection pipe including a plurality of brackets connected to one of the two sidewalls of the housing of the transformer body, with a plurality of posts fixed between one of the upper connection pipes and one of the lower connection pipes, with the plurality of posts spaced from each other, with the at least one fixing frame of each of the first and second sound absorbing devices including a plurality of fixing frames, and with each of the plurality of fixing frames fixed between two adjacent posts.

7. The power transmission transformer with a noise inhibiting function as claimed in claim 6, with each of the upper connection pipes, the lower connection pipes, and the plurality of posts including a plurality of fixing plates, with each of the plurality of fixing plates having a fixing hole, with each outer wallboard including a plurality of fixing holes aligned with the fixing holes of the plurality of fixing plates of the upper connection pipes, the lower connection pipes, and the plurality of posts, and with a plurality of bolts extending through the plurality of fixing holes of each outer wall board and the fixing holes of the plurality of fixing plates of the upper connection pipes, the lower connection pipes, and the plurality of posts.

8. The power transmission transformer with a noise inhibiting function as claimed in claim 6, with a resilient frame pad mounted around each of the plurality of fixing frames, and with each resilient frame pad having an outer side contacting with one of the upper connection pipes, one of the lower connection pipes, two adjacent posts, and the plurality of fixing plates of the one of the upper connection pipes, the one of the lower connection pipes, and the two adjacent posts.

9. The power transmission transformer with a noise inhibiting function as claimed in claim 6, with each of the first and second sound absorbing devices further including a plurality of outer shielding boards, with each of the plurality of fixing frames and one of the plurality of outer shielding boards defining a space receiving one of the sound absorbing materials, and with each of the plurality of outer shielding boards including a plurality of vents.

10. The power transmission transformer with a noise inhibiting function as claimed in claim 9, wherein the sound absorbing material of each of the first and second sound absorbing devices wrapped by a waterproof film.

* * * * *